June 26, 1956  J. VOGT  2,752,180
PROTECTION CAPS FOR JOINTS
Filed Aug. 20, 1953

INVENTOR
JAKOB VOGT
BY Robert H. Jacob
AGENT

United States Patent Office 2,752,180
Patented June 26, 1956

2,752,180

PROTECTION CAPS FOR JOINTS

Jakob Vogt, Dusseldorf-Oberkassel, Germany, assignor to A. Ehrenreich & Cie.

Application August 20, 1953, Serial No. 375,457

1 Claim. (Cl. 288—19)

This invention relates to a protective casing or cap for a joint of the kind comprising a socket in which a member having a part projecting through an opening in the socket is movable, such as for example a ball and socket joint, which is movable in all directions. The cap is in the form of a cup having an opening in its bottom the edge of which opening embraces the projecting part of said member, the cup widening towards the socket with which its inner surface makes contact.

The known protective casing or caps for joints of the abovementioned kind have the disadvantage that fine particles of dirt and dust are able to penetrate between the adjacent surfaces of the socket and the cap, and although only small quantities may penetrate, such penetration in the course of time defeats the object which the cap is intended to achieve.

Guards in the form of a bellows are also known, but these are relatively expensive and sensitive, and they require special fastening means.

According to the invention, the part to the inner surface of the cup which contacts the outer surface of the socket has a recess or curved groove which is pressed inwardly by the outer surface of the socket, so that the casing makes a close contact with the socket. Owing to this, the casing adheres tightly by suction to the outer surface of the socket of the joint, the bulged part being pressed against the socket, and the possibility of the entrance of air is excluded and the tendency of the cup to assume its original shape holds the cap by suction on the socket. Preferably, the casing is provided at its upper end with an inwardly projecting lip. This lip increases the amount of the grooved part to be pressed outwardly by the socket with the consequence that an increased suction effect is produced when the edge of the groove and the lip are pressed outwardly.

The part of the casing adjacent to the part of the joint projecting from the opening in the socket may suitably be formed around the bottom opening with an upwardly projecting sleeve-like portion. In this way, the cap is given a large surface for embracing the pin projecting from the socket which ensures complete tightness at this place. Further, it provides a resilient stop for limiting angular movements of the joint.

Two forms of protecting cups in accordance with the invention are illustrated, by way of example, in the accompanying drawing, in which.

Figure 1:
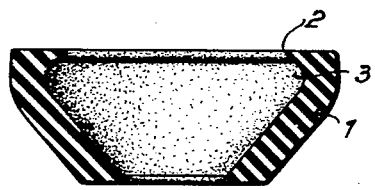
Fig. 1 is a section through a cup of the first form.
Figure 2:
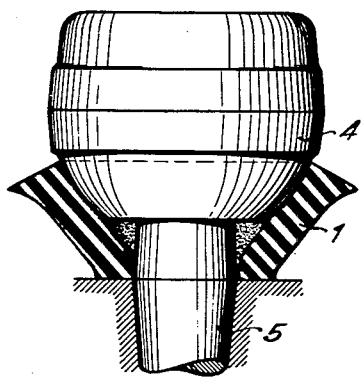
Fig. 2 is a section through the cup of Fig. 1 when fitted over the socket of a joint.

Referring to Figs. 1 and 2, the guard or protector 1, which is made of elastic material, for example rubber, has the form of a suction cup which is due to the fact that the inner surface of the cup has a curved groove 3 in the region where it contacts the casing which groove is pressed inwardly when the cup is pressed over the casing of the joint. The effect of the groove 3 is increased by the lip 2 at the inner edge of the cup. When the cup is fitted over a joint, the cup 1 assumes the shape shown in Fig. 2 in which the groove 3 lies closely in contact with the casing 4 of the joint.

Figure 3:
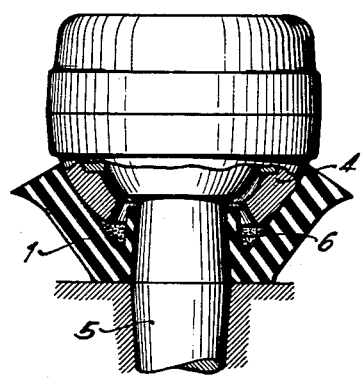
Fig. 3 is a longitudinal section through a joint having a cup of a slightly different construction.

According to Fig. 3, the inner edge of the bottom opening in the cup adjacent the pin 5 is provided with a sleeve-like portion 6 which projects into the interior of the cup. This sleeve-like portion 6 closely adheres to the pin 5 with which it is in contact over a large surface.

I claim:

An elastic protective casing for a ball and socket joint comprising a socket and a ball headed rod having a shank projecting from said socket, said socket being of the type having a lower cup portion presenting a substantially spherical outer surface adjacent to said shank and said shank presenting a substantially cylindrical surface, said casing being of elastic material and having a lower aperture adapted to closely fit around said shank, an upwardly and outwardly extending portion having a conical inner surface merging by way of an upwardly and inwardly curved grooved portion into an inwardly extending lip portion; said grooved portion being substantially in the form of a recess intermediate said lip portion and said conical inner surface, and said lip portion turning outwardly pressing said recess against said spherical outer surface for the position of said casing in situ on said lower cup portion, and a closely fitting tubular sleeve portion extending around said shank and upwardly from said aperture toward the inside of said casing.

References Cited in the file of this patent

UNITED STATES PATENTS

| | | |
|---|---|---|
| 1,779,018 | Smallwood et al. | Oct. 21, 1930 |
| 1,815,771 | Grant | July 21, 1931 |
| 2,321,250 | Russell | June 8, 1943 |
| 2,569,823 | Moskovitz | Oct. 2, 1951 |